US010069784B2

(12) United States Patent
Pellicer et al.

(10) Patent No.: US 10,069,784 B2
(45) Date of Patent: Sep. 4, 2018

(54) ASSOCIATING A SEGMENT OF AN ELECTRONIC MESSAGE WITH ONE OR MORE SEGMENT ADDRESSEES

(71) Applicant: Google Inc., Mountain View, CA (US)

(72) Inventors: Edgar Gonzalez Pellicer, San Francisco, CA (US); Amarnag Subramanya, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/331,456

(22) Filed: Oct. 21, 2016

(65) Prior Publication Data

US 2017/0070469 A1    Mar. 9, 2017

Related U.S. Application Data

(63) Continuation of application No. 14/168,852, filed on Jan. 30, 2014, now Pat. No. 9,497,153.

(51) Int. Cl.
*G06F 15/16* (2006.01)
*H04L 12/58* (2006.01)
(Continued)

(52) U.S. Cl.
CPC ............ *H04L 51/28* (2013.01); *G06F 17/278* (2013.01); *G06F 17/2775* (2013.01);
(Continued)

(58) Field of Classification Search
CPC ..... H04L 51/28; H04L 51/18; H04L 17/2775; H04L 51/063; G06F 17/2775; G06F 17/278
See application file for complete search history.

(56) References Cited

U.S. PATENT DOCUMENTS

| 6,115,709 A | 9/2000 | Gilmour et al. |
| 6,438,543 B1 | 8/2002 | Kazi et al. |
| (Continued) | | |

FOREIGN PATENT DOCUMENTS

| EP | 2339514 | 6/2011 |
| WO | 03032190 | 4/2003 |

OTHER PUBLICATIONS

International Search Report and Written Opinion of PCT Ser. No. PCT/US15/13582 dated May 27, 2015.
(Continued)

*Primary Examiner* — Viet D Vu
(74) *Attorney, Agent, or Firm* — Middleton Reutlinger

(57) ABSTRACT

Methods and apparatus related to associating a segment of an electronic message with one or more segment addressees. One or more message addressees of an electronic message may be identified, the one or more message addressees identifying at least one recipient of the electronic message. A segment of the electronic message may be identified via one or more processors. One or more segment addressees may be determined from the at least one recipient, the one or more segment addressees identifying an addressee for the identified segment. One or more aspects of the segment may be associated with the one or more segment addressees. An indication pertaining to the one or more aspects of the segment may be provided to the one or more segment addressees.

18 Claims, 7 Drawing Sheets

(51) Int. Cl.
  *G06Q 10/10* (2012.01)
  *G06F 17/27* (2006.01)
(52) U.S. Cl.
  CPC ......... *G06Q 10/107* (2013.01); *H04L 51/063* (2013.01); *H04L 51/18* (2013.01)

(56) References Cited

U.S. PATENT DOCUMENTS

| | | | |
|---|---|---|---|
| 7,092,993 B2* | 8/2006 | Goldberg | G06Q 10/107 370/465 |
| 7,475,010 B2 | 1/2009 | Chao | |
| 7,496,500 B2 | 2/2009 | Reed et al. | |
| 7,672,833 B2 | 3/2010 | Blume et al. | |
| 7,702,631 B1 | 4/2010 | Basu et al. | |
| 7,747,692 B2* | 6/2010 | Larsen | G06Q 10/107 709/203 |
| 7,813,916 B2 | 10/2010 | Bean | |
| 8,046,226 B2 | 10/2011 | Soble et al. | |
| 8,055,707 B2 | 11/2011 | Desai et al. | |
| 8,364,467 B1 | 1/2013 | Bowman et al. | |
| 8,375,099 B2 | 2/2013 | Carroll et al. | |
| 8,457,950 B1 | 6/2013 | Gardner et al. | |
| 8,521,818 B2 | 8/2013 | McGann et al. | |
| 8,527,522 B2 | 9/2013 | Baron et al. | |
| 2003/0043201 A1 | 3/2003 | Abdelhadi et al. | |
| 2003/0131057 A1 | 7/2003 | Basson et al. | |
| 2004/0205451 A1 | 10/2004 | Kowalski | |
| 2007/0016614 A1 | 1/2007 | Novy | |
| 2007/0106736 A1* | 5/2007 | Shepherd | G06Q 10/107 709/206 |
| 2008/0104052 A1 | 5/2008 | Ryan et al. | |
| 2008/0127339 A1 | 5/2008 | Swain et al. | |
| 2008/0222254 A1 | 9/2008 | Mukherjee | |
| 2009/0006565 A1 | 1/2009 | Velusamy et al. | |
| 2009/0313240 A1 | 12/2009 | Gile et al. | |
| 2011/0137636 A1 | 6/2011 | Srihari et al. | |
| 2012/0005221 A1 | 1/2012 | Ickman et al. | |
| 2012/0030588 A1 | 2/2012 | Sinha | |
| 2012/0150532 A1 | 6/2012 | Mirowski et al. | |
| 2012/0239761 A1 | 9/2012 | Linner et al. | |
| 2012/0317499 A1 | 12/2012 | Shen | |
| 2013/0073662 A1 | 3/2013 | Meunier et al. | |
| 2013/0290436 A1 | 10/2013 | Martin et al. | |

OTHER PUBLICATIONS

Corston-Oliver, Simon et al, "Task-Focused Summarization of Email," Microsoft Research Jul. 2004, http://www.1cs.columbia.edu/~lokesh/pdfs/Corston.pdf, 8 pages.

Laclavik, et al., "Email Analysis and Information Extraction for Enterprise Benefit," Institute of Informatics, Slovak, Academy of Sciences, Slovakia, Computing and Information, vol. 30, 2011, pp. 57-87.

Komen, Erwin R. "Coreference Annotation Guidelines1," 2009, 13 pages.

* cited by examiner

Sent on Feb. 05, 2013 at 10:05 P.M.
From: Lisa ◄─────────────────────────────────── 205
To: John, Maggie, Joe ◄───────────────────────── 210

You all can meet in the conference room at 3. ◄──── 215

John, Joe, could you bring your laptops please? ◄─── 220

Maggie, I will need your market report. Could you bring your report too, Joe?◄── 225

Could you also arrange for pizza, Joe? ◄─────────── 230

I will join you all after your meeting. Contact me when you are done, John. ◄── 235

| $C_1$ | $C_2$ | $C_3$ | $C_4$ | $C_5$ | $C_6$ | $C_7$ | $C_8$ |
|---|---|---|---|---|---|---|---|
| No. | Segment Content | Noun Phrase | Disambiguated Noun Phrase | Message Addressees | Collection of Global Addressees | Collection of Vocative Addressees | Segment Addressees |
| 1. | You all can meet in the conference room at 3. | You | John, Maggie, Joe | John, Maggie, Joe | {John, Margaret, Joseph} | Empty | John, Margaret, Joseph |
| 2. | John, Joe, could you bring your laptops please? | John, Joe, you, your | John, Joe | John, Maggie, Joe | {John, Joseph} | Empty | John, Joseph |
| 3. | Maggie I will need your market report. | I | Lisa | John, Maggie, Joe | {Margaret} | Empty | Margaret |
|  |  | your | Maggie |  |  |  |  |
| 4. | Could you bring your report too, Joe? | You, your, Joe | Joe | John, Maggie, Joe | {John, Margaret, Joseph} | {Joseph} | Joseph |
| 5. | Could you also arrange for pizza, Joe? | You, Joe | Joe | John, Maggie, Joe | {John, Margaret, Joseph} | {Joseph} | Joseph |
| 6. | I will join you all after your meeting. | I | Lisa | John, Maggie, Joe | {John, Margaret, Joseph} | Empty | John, Margaret, Joseph |
|  |  | You, your | John, Maggie, Joe |  |  |  |  |
| 7. | Contact me when you are done, John. | me | Lisa | John, Maggie, Joe | {John, Margaret, Joseph} | {John} | John |
|  |  | You, John | John |  |  |  |  |

FIG. 3

| Segment Addressee | Segment Number | Task |
|---|---|---|
| John | First | Meet Margaret and Joseph in the conference room at 3. |
| | Second | Take your laptop |
| | Sixth | Meet Margaret, Joseph and Lisa in the conference room after the first meeting |
| | Seventh | Contact Lisa after the first meeting |
| Margaret | First | Meet John and Joseph in the conference room at 3. |
| | Third | Take your market report |
| | Sixth | Meet John, Joseph and Lisa in the conference room after the first meeting |
| Joseph | First | Meet John and Margaret in the conference room at 3. |
| | Second | Take your laptop |
| | Fourth | Take your market report |
| | Fifth | Arrange for pizza |
| | Sixth | Meet John, Margaret and Lisa in the conference room after the first meeting |

FIG. 4

ASSOCIATING A SEGMENT OF AN ELECTRONIC MESSAGE WITH ONE OR MORE SEGMENT ADDRESSEES

BACKGROUND

Electronic messages may include different parts that are directed to different persons. For example, a first part may be directed to all recipients of the message, and a second part may be directed to a subset of the recipients.

SUMMARY

The present disclosure is generally directed to methods and apparatus related to associating a segment of an electronic message with one or more segment addressees. One or more message addressees of an electronic message may be identified, the one or more message addressees identifying at least one recipient of the electronic message. A segment of the electronic message may be identified via one or more processors. One or more segment addressees may be determined from the at least one recipient, the one or more segment addressees identifying an addressee for the identified segment. One or more aspects of the segment may be associated with the one or more segment addressees. An indication pertaining to the one or more aspects of the segment may be provided to the one or more segment addressees.

Some implementations are directed to identifying a vocative associated with the segment, and determining the one or more segment addressees based on the vocative. Some implementations are directed to determining that the segment does not include a vocative, and determining the one or more segment addressees based on the at least one recipient. In some implementations the one or more segment addressees may be determined based on a coreference resolution of a noun phrase in the segment.

In some implementations a computer implemented method may be provided that includes the steps of: identifying, via one or more processors, one or more message addressees of an electronic message, the one or more message addressees identifying at least one recipient of the electronic message; identifying, via the one or more processors, a segment of the electronic message; determining, via the one or more processors, one or more segment addressees from the at least one recipient, the one or more segment addressees identifying an addressee of the identified segment; identifying, via the one or more processors, a task associated with the segment; associating, via the one or more processors, one or more aspects of the task associated with the segment with the one or more segment addressees; and providing, to the one or more segment addressees, an indication pertaining to the one or more aspects of the task associated with the segment.

This method and other implementations of technology disclosed herein may each optionally include one or more of the following features.

In some implementations determining the one or more segment addressees may include identifying a collection of global addressees associated with the segment, and determining the one or more segment addressees based on the collection of global addressees.

In some implementations determining the one or more segment addressees may include identifying, based on a presence or absence of a vocative in the segment, a collection of vocative addressees associated with the segment, and determining the one or more segment addressees based on the collection of vocative addressees.

In some implementations determining the one or more segment addressees may include identifying at least one noun phrase associated with the segment, and determining the one or more segment addressees based on the at least one noun phrase. In some implementations determining the one or more segment addressees may include determining a coreference resolution for a given noun phrase of the at least one noun phrase, and determining the one or more segment addressees based on the coreference resolution of the given noun phrase. In some implementations determining the coreference resolution for the given noun phrase may include associating, with the given noun phrase, the one or more message addressees. In some implementations determining the coreference resolution for the given noun phrase may include learning a coreference embedding for the given noun phrase. Learning the coreference embedding may be based on generating at least one feature representation of the given noun phrase. In some implementations the at least one feature representation of the given noun phrase may include a feature representation of the given noun phrase as a vocative noun phrase.

In some implementations determining the one or more segment addressees may include identifying an alias in the segment, and identifying a given message addressee based on an association of the given message addressee with the alias. In some implementations the alias may be a hypocorism of the given message addressee.

In some implementations identifying the segment of the electronic message may be based on identification of one or more of a paragraph break and a line break.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein may identify one or more segment addressees from the at least one recipient of an electronic message. The association of one or more aspects of the segment of the electronic message with the one or more segment addressees represents a new aspect of the electronic message.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 is an illustration of an example electronic message.

FIG. 3 is a table illustrating example segments and associated segment addressees.

FIG. 4 is a table illustrating example segment addressees, segments, and associated tasks.

DETAILED DESCRIPTION

Technology described herein is useful in associating a segment of an electronic message with one or more segment addressees. For example, an electronic message may be generated by Lisa, and addressed to one or more message addressees such as John and Maggie. The content of the electronic message may include: "John, could you bring your laptop. Could you bring a copy of your market analysis report, Maggie? We will meet at 4." A first segment may be identified as "John, could you bring your laptop". A second segment may be identified as "Could you bring a copy of your market analysis report, Maggie?" A third segment may be identified as "We will meet at 4."

Based on techniques described herein, the one or more message addressees may be identified to include the recipients, John and Maggie. It may be determined that the first segment includes an initial exhortation "John," that identifies an addressee "John" associated with the first segment. Accordingly, "John" may be determined to be the segment addressee associated with the first segment.

It may be determined that the second segment includes a vocative "Maggie" that identifies an addressee for the second segment. "Maggie" may be identified as a hypocorism, and one or more databases may be utilized to identify that "Maggie" is associated with the noun phrase "Margaret". Accordingly, "Margaret" and/or "Maggie" may be determined to be the segment addressee associated with the second segment.

It may be determined that the third segment does not include a vocative. However, it may be determined that the third segment includes a noun phrase "We". The noun phrase "We" may be disambiguated based on the addressees as Lisa, John, and Margaret. Accordingly, "John", and "Margaret" may be determined to be the segment addressees associated with the third segment.

Figure 1:
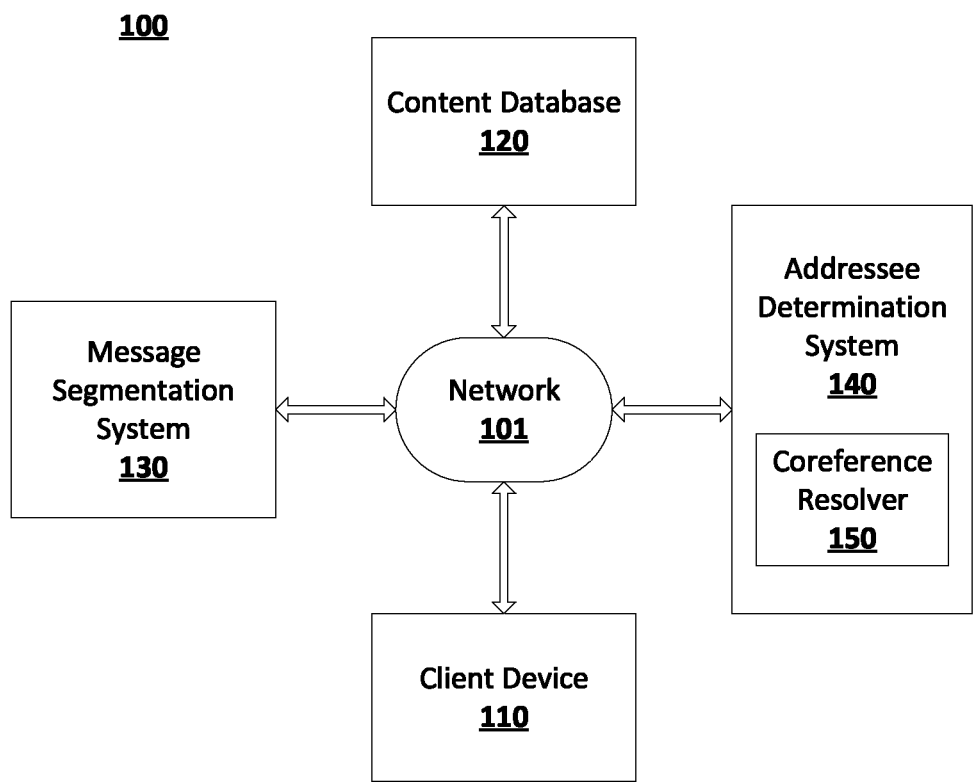
FIG. 1 is a block diagram of an example environment in which a segment of an electronic message may be associated with one or more segment addressees.

FIG. 1 illustrates a block diagram of an example environment 100 in which a segment of an electronic message may be associated with one or more segment addressees. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 also includes a client device 110, a content database 120, a message segmentation system 130, an addressee determination system 140, and a coreference resolver 150. Many other configurations are possible having more or fewer components than the environment shown in FIG. 1. For example, in some environments the addressee determination system 140 and the coreference resolver 150 may be separate components of the environment.

The client device 110 may execute one or more applications, such as a web browser. The client device 110 may be, for example, a desktop computer, a laptop, a mobile phone, a computing device of a vehicle of the user (e.g., an in-vehicle communications system, an in-vehicle entertainment system, an in-vehicle navigation system), a wearable apparatus of the user that includes a computing device (e.g., a watch having a computing device, glasses having a computing device). Additional and/or alternative computing devices may be provided.

One or more message addressees of the electronic message may be identified, the one or more message addressees identifying at least one recipient of the electronic message. In some implementations the message segmentation system 130 may identify the one or more message addressees of the electronic message. In some implementations metadata of the electronic message may provide indication of the one or more message addressees for the electronic message. Metadata of the electronic message may include data of the electronic message that pertains to one or more properties of the electronic message, such as a sender and/or recipients of the electronic message. For example, a header of an email communication may be metadata and may provide a path of the electronic message, including identifiers for one or more persons in the path. For example, person A may send a first message to persons B and C, and person B may include the first message in a second message to persons D and E. In such instances, persons B and C may be identified as message addressees of the first message, and persons D and E may be identified as message addressees of the second message.

In some implementations the message segmentation system 130 may identify a segment of the electronic message. In some implementations, the segment of the electronic message may be identified based on one or more determined language units such as words, lines, sentences, paragraphs, and/or topics. For example, the message segmentation system 130 may identify each character associated with a "period", and may identify a sentence as a text segment between two consecutive characters associated with a "period". In some implementations a segment of an electronic message may be identified based on line breaks, paragraph breaks, section breaks, topic headings, page breaks, and so forth. For example, the message may be in html format, and the message segmentation system 130 may identify a paragraph based on identifying an html tag for a paragraph break. In some implementations topic change markers may be identified and utilized to determine the segments. For example, the message segmentation system 130 may identify terms such as "step", "moving on", "next part", "other step", "previous step", "in conclusion", etc. as topic change markers, and utilize such markers to determine the segments.

As described herein, in some implementations a segment of the electronic message may be a paragraph of the electronic message. For example, an electronic message in html format may include tag references for a single line break (e.g., <br>), and/or for a paragraph break (e.g., </p>), and one or more of the tag references may be utilized to identify a paragraph. In some implementations an identified segment may include two or more paragraphs. One or more natural language processing techniques may be optionally utilized to identify a paragraph and/or other text segment of the electronic message. For example, key terms and/or key phrases may be identified along with their parts of speech. A parse tree may be determined that links key terms and/or phrases in one or more sentences based on their syntactic and/or semantic relationships. In some implementations a context-free grammar may be utilized to structure a sentence from the parse tree. Transitional terms such as "first", "next", "followed by", "after", "at the outset", "finally", etc. may be optionally utilized to identify a segment that is a paragraph and/or a sentence. Additional and/or alternative techniques may be utilized to segment an electronic message. For example, statistical decision making techniques, as well as syntactic and semantic attributes of the message may be utilized to identify segments.

In some implementations one or more aspects of the electronic message may be modified to facilitate analysis. For example, one or more aspects of the electronic message may be altered and/or removed to facilitate analysis. In some implementations an annotator may be utilized to identify portions of the electronic message that include a quoted text segment, and such identified portions may be associated with tags. For example, for an electronic message in html format, an html entity code for a quotation mark (e.g., ") may be utilized to tag the identified portions. Such tags may be utilized, for example, to ignore the quoted text segment during linguistic analysis. For example, based at least on the tags, the message segmentation system 130 may not analyze such identified portions to identify a segment. In some implementations a case-insensitive lexicon may be utilized for dependency parsing. For example, the message segmentation system 130 may not distinguish between the terms "John" and "john" for purposes of dependency parsing.

In some implementations a task associated with the segment may be identified. Generally, the task may relate to a request and/or an instruction to perform an action. In some implementations the request and/or instruction may be directed to a recipient of the electronic message. In some implementations the message segmentation system 130 may identify the task based on one or more techniques, such as, for example, conventional classifier techniques and/or language processing techniques. For example, the electronic message may include a segment such as "Joe, could you pick Molly up today?". Based on conventional and/or other techniques, "Pick Molly up today" may be identified as a task. For example, one or more terms of the segment may be provided to the classifier as input and the output of the classifier may indicate likelihood that the segment indicates a task request.

One or more segment addressees of the at least one recipient may be determined, the one or more segment addressees identifying an addressee for the identified segment. In some implementations the addressee determination system 140 may determine the one or more segment addressees of the one or more segments of the electronic message. In some implementations the one or more segment addressees of a segment may include each recipient of the electronic message. For example, John may send a message to Lisa and Joe, and the message may include the sentence "See you soon." In some implementations Lisa and Joe may be identified as the one or more message addressees of the electronic message, and the sentence "See you soon" may be identified as a segment. The coreference resolver 150 may resolve the term "you" to refer to Lisa and Joe, based at least in part on the determination that Lisa and Joe are the recipients of the electronic message. Accordingly, the one or more segment addressees may be determined to be Lisa and Joe. Also, for example, Lisa may send a first message to John and Joe, and John may respond to the first message with "ok". The message segmentation system 130 may identify "ok" as a segment, optionally as a segment that does not include a noun phrase, and the addressee determination system 140 may determine the one or more segment addressees associated with the only segment in John's message to be Lisa and Joe, based on the identified recipients of John's message.

In some implementations determining the one or more segment addressees may include identifying, from the at least one recipient, a collection of global addressees. The collection of global addressees identifies the at least one recipient to whom the segment of the electronic message is addressed. For example, the segment of the message may be addressed to all the recipients. In such an instance, the collection of global addressees is the collection of all the recipients of the electronic message. In some implementations, the collection of global addressees may be updated based on the segment of the electronic message, as for example, when the segment of the electronic message may be addressed to a subset of the recipients of the electronic message. For example, John may send a message to Lisa and Joe, and the message may include the sentence "See you soon. Joe can you pick me up in 5 mins?". As previously described, Lisa and Joe may be identified as the one or more message addressees. In some implementations, the collection of global addressees may be initialized to the collection {Lisa, Joe}. Although the sentence "See you soon" is directed to both the recipients Lisa and Joe, the request "Joe can you pick me up in 5 mins?" is directed specifically to Joe and not to Lisa. Accordingly, the collection of global addressees may be updated from the collection {Lisa, Joe} to the collection {Joe}.

In some implementations the collection of global addressees may be identified based on an initial exhortation. The initial exhortation is an exhortation that may appear in an initial portion of a segment. For example, the segment may be "John, Maggie, could you please bring your laptops?". In such an instance, "John" and "Maggie" are initial exhortations identifying John and Maggie as persons to whom the segment is addressed. Accordingly, the collection of global addressees may be identified as the collection {John, Maggie}. Also, for example, "Hello, John", "Dear Mary", and "Peter" may be initial exhortations. Accordingly, the collection of global addressees may be updated based on the initial exhortation. For example, a segment that includes the initial exhortation "Hello, John" may be associated with a collection of global addressees {John}. Also, for example, a segment that includes the initial exhortation "Peter" may be associated with a collection of global addressees {Peter}. In some implementations, the initial exhortation may be determined after the removal of words and/or phrases in the segment, such as after the removal of stop words.

In some implementations determining the one or more segment addressees may include identifying, based on a presence or absence of a vocative in the segment, a collection of vocative addressees. The collection of vocative addressees identifies the at least one recipient to whom the segment of the electronic message is addressed to via a vocative. In the absence of a vocative, the collection of vocative addressees may be an empty collection. A vocative is a phrase that may be utilized to attract the attention of a person identified by the phrase. In some implementations the vocative may appear at the end of the segment, and may be separated by a comma (e.g., "Please bring me some coffee, kiddo."). In some implementations the vocative may appear within the flow of the segment, and may be separated by a pair of commas (e.g., "Please bring me some coffee, kiddo, and the newspaper.").

In some implementations the addressee determination system 140 may update the collection of vocative addressees based on a determination that a vocative is present in the segment. A vocative addressee may be the disambiguated identifier for a vocative. In situations where the vocative identifies a person unambiguously, the identified person is the vocative addressee. For example, in "Please bring me some coffee, Joe", the vocative identifies "Joe" as the person being addressed in the segment. Accordingly, the collection of vocative addressees may be updated from the empty collection to the collection {Joe}, and "Joe" may be identified as the vocative addressee.

In some implementations the addressee determination system 140 may identify the collection of vocative addressees based on a noun phrase in the segment. For example, a part-of-speech tagger may identify a named noun phrase, and the addressee determination system 140 may include the named noun phrase in the collection of vocative addressees. For example, in "Please bring me some coffee, Joe", the part-of-speech tagger may identify "Joe" as a named noun phrase. Accordingly, the addressee determination system 140 may identify the collection of vocative addressees as {Joe}. In some implementations "Joe" may be identified as a vocative addressee.

In some implementations determining the one or more segment addressees from the at least one recipient may include identifying at least one noun phrase associated with the segment. A noun phrase is a phrase that has a noun (e.g., a name) and/or pronoun (e.g., she, it, they, you, yours) as its head token. The head token of a noun phrase determines its syntactic type. For example, in the phrase "living room" the head token is "room", thereby defining "living room" as a noun phrase, instead of a verb phrase or an adjective phrase. As another example, in the phrase "faculty group", the head token is "faculty", thereby defining "faculty group" as a noun phrase, instead of a verb phrase or an adjective phrase. Also, for example, in the phrase "50 Professionals under 50" the head token is "Professionals".

In some implementations the one or more segment addressees may be determined in the absence of a noun phrase and/or a vocative in the segment. For example, an electronic message may be "Segment A. Please call". The message segmentation system 130 may identify "Segment A" as a first segment, and may identify "Please call" as a second segment. The addressee determination system 140 may determine that "Segment A" may be associated with one or more segment addressees. The message segmentation system 130 may determine that the second segment "Please call" does not include a noun phrase and/or a vocative. Accordingly, the addressee determination system 140 may associate the segment "Please call" with the one or more segment addressees associated with the first segment, "Segment A".

In some implementations the coreference resolver 150 may identify the at least one noun phrase associated with the segment. In some implementations the coreference resolver 150 may utilize one or more language processing techniques to identify the at least one noun phrase. For example, portions of the electronic message may be parsed and/or tagged based on computational linguistic analysis (e.g., a part-of-speech tagger), and the coreference resolver 150 may utilize such parsed and/or tagged portions of the electronic message to identify the at least one noun phrase.

Noun phrases may be of one or more mention types including named, nominal, or pronominal. For example, "John", "Lisa", "Joe", and "Maggie" are named noun phrases. As another example, "President", "Dr.", "Professor", and "Assistant Director" are nominal noun phrases. Also, for example, "he", "his", "her", and "him" are pronominal noun phrases.

In some implementations the vocative may be identified based on the at least one noun phrase, the vocative identifying a named entity associated with the at least one noun phrase. In some implementations the coreference resolver 150 may identify a comma, for example by identifying an html code such as ",", and may identify a noun phrase following the comma. Based at least in part on such identifications, the coreference resolver 150 may identify the noun phrase appearing after the comma as a vocative noun phrase. For example, the appearance of ", Joe." may be indicative of "Joe" being a vocative noun phrase. In some implementations the vocative noun phrase may appear within the flow of the sentence and may be separated from the sentence by a pair of commas (e.g., "Please bring me some coffee, Joe, and the newspaper.").

In some implementations the coreference resolver 150 may identify the collection of vocative addressees based on coreference resolution of the vocative noun phrase. For example, in the sentence, "Please bring me some coffee, kiddo", the vocative noun phrase may be identified as "kiddo", and the vocative addressee may be identified as the named noun phrase associated with the vocative noun phrase "kiddo". As described herein, one or more techniques may be utilized to disambiguate the term "kiddo", and the vocative addressee may be determined to be the disambiguated term for "kiddo". In some implementations the one or more segment addressees may be determined based on the collection of vocative addressees. For example, in the sentence, "Please bring me some coffee, Joe", the vocative noun phrase identifies "Joe" as the vocative addressee, and the one or more segment addressees may be determined to be the vocative addressee "Joe".

In some implementations the vocative may not identify a person unambiguously. For example, the vocative noun phrase may be a nominal, and/or pronominal noun phrase. In such instances, the collection of vocative addressees may be identified by disambiguating the vocative noun phrase. For example, John may send a message to Lisa and Joe, and the message may include the sentence "See you soon, kiddo." One or more techniques may be utilized to disambiguate the term "kiddo" to mean "Joe". For example, one or more prior messages sent by John may indicate that "kiddo" refers to Joe. For example, John may have sent a prior message to Joe with the message "Take care of yourself, kiddo," indicating that John may refer to Joe as "kiddo". In some implementations such information may be identified based on one or more electronic messages associated with John, and the information may be stored in one or more databases such as content database 120. In some implementations the one or more databases may be personal databases that may include access restricted to John and/or one or more users authorized by John. Accordingly, the vocative noun phrase "kiddo" may be disambiguated to "Joe", and the collection of vocative addressees may be updated from the empty collection to {Joe}. Based at least in part on such identification, the one or more segment addressees of the one or more message addressees may be determined to be Joe.

As described herein, in some implementations identifying the one or more segment addressees of the one or more message addressees may further include determining that the segment does not include a vocative. For example, the addressee determination system 140 may analyze the electronic message for text including ", X." and/or ", X," where X is tagged as a noun phrase by the part-of speech tagger. Based at least in part on such analysis, the addressee determination system 140 may determine that the electronic message, and/or a portion of the electronic message does not include a vocative. In such instances, based on the determination that the electronic message does not include a vocative, the addressee determination system 140 may determine the one or more segment addressees based on the collection of global addressees.

For example, as described herein, one or more portions of the electronic message may be directed to all the recipients of the electronic message. This may be indicated by an absence of a vocative. For example, a message to Lisa and Joe might include the sentence "Take care of yourselves." In some implementations the message segmentation system 130 may identify the absence of a vocative in the sentence. In some implementations the one or more segment addressees may be determined to be the global addressee associated with at least one noun phrase "yourselves". For example, the coreference resolver 150 may identify Lisa and Joe as the recipients of the electronic message, and may disambiguate the term "yourselves" to determine the collection of global addressees to be {Lisa, Joe}. Based at least in part on the determination that the sentence "Take care of yourselves" does not include a vocative, the addressee determination system 140 may determine the one or more segment addressees to be the global addressees Lisa and Joe, based on the collection of global addressees {Lisa, Joe}.

Also, for example, Lisa may send a first message to John and Joe, and John may respond to the first message with "ok". The message segmentation system 130 may identify "ok" as a segment, optionally as a segment that does not include a noun phrase and/or a vocative. The addressee determination system 140 may determine the collection of global addressees associated with John's message to be {Lisa, Joe}, based on the at least one recipient of the electronic message. Accordingly, in the absence of a vocative, the one or more segment addressees associated with the segment "ok" may be determined to be the global addressees Lisa and Joe, based on the collection of global addressees {Lisa, Joe}.

In some implementations noun phrases in an electronic message may be co-referential. Co-referential noun phrases refer to the same entity. For example, an electronic message addressed to Lisa and Joe may include a text segment: "See you in a few. Dr. Joe, Prof. Lisa has my draft. Could you remind her to bring it? Lisa, send the Dr. a copy of my draft. Dr. J. the Prof. is brilliant". The noun phrase "you" may be determined to refer to "Lisa" and "Joe". As another example, the nominal noun phrase "Dr.", and the pronominal noun phrase "you" (in the sentence "Could you remind her to bring it?") may both refer to the named noun phrase "Joe". Also, for example, the nominal noun phrase "Prof.", and the pronominal noun phrase "her" (in the sentence "Could you remind her to bring it?") may both refer to the named noun phrase "Lisa".

In some implementations a coreference resolution of a given noun phrase of the at least one noun phrase may be determined. In some implementations the coreference resolver 150 may determine the coreference resolution of the given noun phrase. In some implementations the coreference resolver 150 may resolve each noun phrase that appears in an electronic message. In some implementations the coreference resolver 150 may resolve noun phrases that appear in a given segment, or in one or more segments. In some implementations the coreference resolver 150 may only coreference the noun phrases that are identified as pronominal noun phrases, such as, for example, "I", "you", "us", "yours", "ours", and so forth.

A noun phrase may be a referring noun phrase and/or an antecedent noun phrase. An antecedent noun phrase is a noun phrase that precedes a given noun phrase in a text segment, and the given noun phrase refers to the antecedent noun phrase. The given noun phrase is also called a referring noun phrase. For example, "Dr. Joe" may be an antecedent noun phrase for the referring noun phrases "Dr. J." and "you". Also, for example, "Prof. Lisa" may be an antecedent noun phrase for the referring noun phrases "the Prof." and "her".

In some implementations identifying the one or more segment addressees may be based on the coreference resolution of the given noun phrase. For example, the collection of global addressees and/or the collection of vocative addressees may be based on the coreference resolution of the given noun phrase. In some implementations the coreference resolver 150 may determine the coreference resolution based on identified distributed word representations of the at least one noun phrase identified in the electronic message. The distributed word representations are indicative of syntactic and/or semantic features of the at least one noun phrase. Syntactic features include syntactic configurations and constraints that may influence coreference relations among noun phrases. For example, syntactic features may include grammatical gender agreement.

Semantic features may include domain features, such as semantic agreement between selectional restrictions on a pronominal predicate argument and a semantic type of the antecedent. In some implementations such features may depend on one or more semantic resources, such as type information in a knowledge base linked to potential antecedents, or unsupervised distributional models that may measure semantic compatibility between two noun phrases. For example, the mention type of a noun phrase may be based on a mapping of the noun phrase to the mention type in a knowledge base.

In some implementations the coreference resolver 150 may access the content database 120 to retrieve stored distributed word representations for the at least one noun phrase in the electronic message. Additional and/or alternative methods of determining distributed word representations may be utilized besides language modeling in natural language processing tasks. For example, the distributed word representations may be determined without language modeling, such as context based next-word probabilities. In some implementations a skip-gram model may be utilized to optimize a distributed representation of a given word to predict words that surround the given word in a sentence in the electronic message.

In some implementations the coreference resolver 150 may determine the coreference resolution by learning a coreference embedding for the given noun phrase. In some implementations learning the coreference embedding may be based on generating at least one feature representation of the given noun phrase. For example, in some implementations for the given noun phrase, a referring feature representation and an antecedent feature representation may be determined. In some implementations the coreference resolver 150 may determine the referring feature representation and the antecedent feature representation for the given noun phrase. In some implementations the referring feature representation of the given noun phrase may be indicative of semantic features of the given noun phrase as a referring noun phrase.

In some implementations the referring feature representation for the given noun phrase may include the distributed word representation for the given noun phrase. The antecedent feature representation for the given noun phrase may include the distributed word representation for the given noun phrase augmented by one or more antecedent features, where the one or more antecedent features may be indicative of semantic features of the given noun phrase as a candidate antecedent noun phrase. In some implementations the referring feature representation may be augmented with at least one referring feature. In some implementations the antecedent feature representation may be the referring feature representation augmented with at least one antecedent feature. The referring and/or antecedent feature may include one or more of a type of mention (e.g., named, nominal, pronominal), a type of entity (e.g., person, location, organization), a type of addressee (e.g., vocative or non-vocative), number of words in the given noun phrase, and a gender associated with the given noun phrase. In some implementations the coreference resolver 150 may access the content database 120 to identify the referring and/or antecedent features associated with the given noun phrase.

In some implementations a tree distance between two noun phrases may be determined by the coreference resolver 150. For example, the coreference resolver 150 may access the content database 120 to retrieve a parse tree associated with the segment of the electronic message. In some implementations each sentence in the segment may be associated with a parse tree. In some implementations the coreference resolver 150 may generate a parse tree for all or part of a segment. For a noun phrase i, the parse tree may be utilized to identify a head token $h_i$ of i. For another noun phrase j in the same sentence as i, a tree distance $d(i,j)$ may be identified, where $d(i,j)$ is a length of a path between i and j, based on the length of a path between head tokens $h_i$ and $h_j$, respectively, in the parse tree. In some implementations i and j may belong to different sentences. In such instances, the tree distance $d(i,j)$ may be based on the number of intervening sentences between i and j. For example, $d(i,j)$ may be a sum of depths of head tokens $h_i$ and $h_j$ within their respective parse trees (e.g., associated with their respective sentences), and the number of sentences between them.

In some implementations the feature representation of the given noun phrase may include a feature representation of the given noun phrase as a vocative noun phrase. The vocative noun phrase generally refers to the one or more segment addressees, whereas a referring noun phrase may not refer to the one or more segment addressees. For example, in the sentences "Maggie brought her market report. Could you bring your report as well, Joe?", the referring noun phrase "her" may be resolved to refer to the antecedent noun phrase "Maggie", but "Maggie" is not a segment addressee. However, the vocative noun phrase "Joe" refers to the segment addressee "Joe".

In some implementations a vocative noun phrase may also be a referring noun phrase. Consider, for example, the following three sentences: "Thanks for coming, Margaret and Joseph. Maggie brought her market report. Could you bring your report as well, Joe?". The vocative noun phrase "Joe" is also a referring noun phrase that refers to the antecedent noun phrase "Joseph". In such situations, the referring feature representation $m_i$ for the vocative noun phrase i may be $$m_i=[r(h_i);t_i;e_i;l_i;v_i],$$

where $r(h_i)$ is the distributed word representation of the head token $h_i$ associated with the noun phrase, $t_i$ is the type of mention associated with the noun phrase, $e_i$ is the type of entity associated with the noun phrase, $l_i$ is the number of words in the noun phrase, and $v_i$ is a feature associated with the vocative noun phrase i, as described herein.

In some implementations a vocative noun phrase may be an antecedent noun phrase. Consider, for example, the following sentence in an electronic message: "Bring me some coffee, Joe, and you can also pick up the newspaper on your way." The vocative noun phrase "Joe" is also an antecedent noun phrase for the pronominal noun phrase "you" that refers to the antecedent noun phrase "Joe". In such situations, the antecedent feature representation $a_j$ for the vocative noun phrase j as a candidate antecedent noun phrase associated with a referring noun phrase i may be $$a_j=[r(h_j);t_j;e_j;l_j;d(i,j);v_j],$$

where $r(h_j)$ is the distributed word representation of the head token $h_j$ associated with the noun phrase j, $t_j$ is the type of mention associated with the noun phrase j, $e_j$ is the type of entity associated with the noun phrase j, is the number of words in the noun phrase j, $d(i,j)$ is the length of a path between the referring noun phrase i and the candidate antecedent noun phrase j, and $v_j$ is a feature associated with the vocative noun phrase j, as described herein.

As indicated, the coreference resolver 150 may determine the coreference resolution by learning a coreference embedding for the given noun phrase. In some implementation referring feature representations and antecedent feature representations for the at least one noun phrase may be embedded into a common space via coreference embeddings, where the coreference embeddings may be indicative of coreference resolution. The coreference embeddings may be learned. In some implementations the iteratively learned coreference embeddings $\varphi$, $\gamma$ may be linear maps with associated matrices M, and A, respectively. For example, $\varphi(m_i)=Mm_i$, $\gamma(a_j)=Aa_j$.

In some implementations the learning may be based on an iterative algorithm, such as an algorithm that optimizes a loss function relevant to coreference resolution. For example, a stochastic gradient descent method may be utilized to learn the coreference embeddings. In some implementations the loss function may be indicative of a number of incorrect candidate antecedent noun phrases associated with a referring noun phrase. In some implementations the coreference resolver 150 may access the content database 120 to retrieve training data that may include labeled data. Such labeled data may include co-referential annotations of the at least one noun phrase appearing in the electronic message. Based on such labeled data, the coreference resolver 150 may identify positive and negative sets of candidate antecedent noun phrases, and utilize these to learn the coreference embeddings.

In some implementations the coreference resolver 150 may determine distance measures between the given noun phrase and one or more candidate antecedent noun phrases may be determined. For example, an inner product of the embedded referring feature representations and the antecedent feature representations may be utilized to determine the distance measures. In some implementations the inner product may be identified as f(i,j), defined as:

$$f(i,j)=\varphi(m_i)^T\gamma(a_j)=(Mm_i)^T(Aa_j)=(m_i)^TM^TAa_j.$$

One or more techniques including clustering and/or ranking (e.g., based on determined distance measures) may be utilized to associate an antecedent noun phrase with the given noun phrase. For example, a score may be associated with each pair of a candidate antecedent noun phrase and the given noun phrase. The score may be based on the determined distance measures. In some implementations the coreference resolver 150 may rank the one or more candidate antecedent noun phrases associated with the given noun phrase. The ranking may be based on the score for the pair comprising of the candidate antecedent noun phrase and the given noun phrase. An antecedent noun phrase of the one or more candidate antecedent noun phrases may be selected based on the ranking. In some implementations candidate antecedent noun phrases associated with the given noun phrase may be grouped based on the ranking and/or scoring. In some implementations the highest ranked candidate antecedent noun phrase in each group may be selected as the antecedent noun phrase associated with the given noun phrase.

In some implementations determining the coreference resolution may further include associating the one or more message addressees with the given noun phrase. For example, the candidate antecedent noun phrases may include the one or more message addressees, and the coreference resolver 150 may co-reference the given noun phrase to the one or more message addressees. For example, an electronic message may be transmitted to Lisa and Joe, and the candidate antecedent noun phrases may be determined to include Lisa and Joe, and the coreference resolver 150 may co-reference a given noun phrase such as "you", "your", and so forth, to Lisa and Joe. Also, for example, an electronic message may be transmitted to Lisa and Joe, and a segment may be identified that addresses Joe. In such an instance, the candidate antecedent noun phrase for the segment may be determined to include Joe, and the coreference resolver 150 may co-reference the given noun phrase such as "you" appearing in the segment to Joe. As another example, an electronic message may be transmitted by Lisa to Joe, and a segment may be identified that addresses Joe. In such an instance, the candidate antecedent noun phrases for the segment may be determined to include Lisa and Joe, and the coreference resolver 150 may co-reference the given noun phrase in the segment, such as "us", to Lisa and Joe. Also, for example, the message from Lisa to Joe may include a sentence "I will see you shortly". Based at least in part on a determination to include Lisa and Joe as the candidate antecedent noun phrases, the pronominal noun phrase "I" may be co-referenced to "Lisa" and the pronominal noun phrase "you" may be co-referenced to "Joe".

In some implementations determining the one or more segment addressees may further include identifying an alias in the segment, and identifying a given message addressee associated with the alias. The term "alias" as it appears herein, may include any version of a name, including misspellings, abbreviations, nicknames, assumed names, an identifier for a name, and so forth. For example, the name Margaret Smith may be associated with one or more aliases such as "Margaret", "Ms. Smith", "Maggie", "Meg", "MS", Ms. MS", "MSmith", "margaret.smith", and so forth. Determination of which, if any, of such aliases may be associated with a person named "Margaret Smith" may be based on techniques including contextual analysis, language processing, coreference resolution, and so forth.

In some implementations identifying the given message addressee associated with the alias may be based on a mapping of a given message addressee to aliases associated with the given message addressee. For example, a database of nodes and associated links may be utilized to represent the mapping of the given message addressee to aliases associated with the given message addressee. A node representing a given message addressee may be linked to one or more nodes represented by aliases associated with the given message addressee. In some implementations such a mapping of noun phrases and aliases may be appropriately indexed to facilitate searching. For example, the addressee determination system 140 may identify an alias in the electronic message, and access the mapping stored in the content database 120 to identify a noun phrase associated with the alias.

In some implementations the alias may be a hypocorism. A hypocorism is an abbreviated or diminutive form of a noun phrase. For example, "movie" is a hypocorism for "moving picture", "phone" is a hypocorism for "telephone", "Joe" is a hypocorism for "Joseph", "Maggie" is a hypocorism for "Margaret", "Betty Beth" is a hypocorism for "Elizabeth", "Scottie" is a hypocorism for "Scott", and so forth. In some implementations a hypocorism may be a nickname, or may be initials in a person's name.

In some implementations a database of hypocorisms may be utilized to associate a hypocorism to a noun phrase to which it refers. For example, a node representing "Elizabeth" in the content database 120 may be linked to one or more associated nodes represented by hypocorisms such as "Beth", "Bess", "Betty Beth", "Lisa", "Liza", "Eliza", and so forth. As another example, nodes for "Alexander", "Alexandra", and "Alexandria" may be linked to one or more associated nodes represented by hypocorisms such as "Al", "Alec", "Alexa", "Alexis", "Alex", "Eck", "Lex", "Lexie", "Sandy", "Xander", and "Xa". The database may optionally be appropriately indexed to facilitate search and/or retrieval. In some implementations a language processor included in the addressee determination system 140 may access the database of hypocorisms to disambiguate a noun phrase.

In some implementations one or more aspects of the segment may be associated with the one or more segment addressees. In some implementations the addressee determination system 140 may associate one or more aspects of a task associated with the segment with the one or more segment addressees. For example, based at least in part on the techniques described herein, a task "Pick me up at 5" may be associated with the segment "John, Joe can you pick me up at 5?", and the segment may be associated with the one or more segment addressees John and Joe. Accordingly, the task "Pick me up at 5" may be associated with the one or more segment addressees John and Joe.

In some implementations, based at least in part on the techniques described herein, the coreference resolver 150 may disambiguate the at least one noun phrase in the electronic message, and/or in a segment of the electronic message, and annotate the electronic message with the co-referenced noun phrases. For example, based at least in part on a determination that the pronominal noun phrase "I" in a segment may be co-referenced to "Lisa" and the pronominal noun phrase "you" in the segment may be co-referenced to "Joe", the segment "I will see you shortly" may be associated with the collection of global addressees {Joe}. In the absence of a vocative in the segment, the segment addressee may be determined to be "Joe".

In some implementations the content database 120 may include a database of structured data that includes nodes that represent electronic messages, segments, the collection of vocative addressees, the collection of global addressees, and segment addressees. In some implementations nodes representing electronic messages may be connected to the associated segment. A node representing an electronic message may also be associated with metadata in the electronic message. A node representing an electronic message may also be associated with metadata in the database of structured data (e.g., via links that represent properties of the electronic message). Any included metadata may include, for example, names/aliases for one or more of senders, recipients, and/or one or more aspects of the segment associated with the electronic message, resources related to the one or more aspects of the task associated with the segment, descriptive information about the one or more aspects of the segment, among other data. In some implementations nodes representing segments may be connected to the associated segment addressees. In some implementations the content database 120 may include a repository of one or more aspects of the segment, such as tasks, actions, entities, events, and/or one or more attributes associated with such tasks, actions, entities, and events. The one or more segment addressees associated with the segment of an electronic message may be linked to the one or more aspects of the segment.

In this specification, the term "database" will be used broadly to refer to any collection of data. The data of the database does not need to be structured in any particular way, or structured at all, and it can be stored on storage devices in one or more geographic locations. Thus, for example, the content database 120 may include multiple collections of data, each of which may be organized and accessed differently.

FIG. 2 is an illustration of an example electronic message. Electronic message 200 includes a sender 205, and one or more recipients 210. Sender 205 may be identified as Lisa based on the field "From:". Likewise, the one or more recipients 210 may be identified as John, Maggie, and Joe, based on the field "To:". Additional recipients may be identified from fields such as "Cc:", "Bcc:", and so forth. In some implementations the message segmentation system 130 may identify the one or more message addressees of the electronic message as John, Maggie, and Joe.

In some implementations the message segmentation system 130 may segment the electronic message into segments. For example, a first segment 215 may be identified, such as the sentence "You all can meet in the conference room at 3." As described herein, the message segmentation system 130 may identify a character representing ".", a line break, sentence break, and/or a paragraph break to determine a transition from the first segment 215 to a new segment. For example, a second segment 220 may be identified, such as "John, Joe, could you bring your laptops please?". As another example, another segment 225 may be identified, such as "Maggie, I will need your market report. Could you bring your report too, Joe?". In some implementations the message segmentation system 130 may further subdivide the segment 225 into two segments, a third segment such as "Maggie, I will need your market report." and a fourth segment such as "Could you bring your report too, Joe?" Also, for example, a fifth segment 230 may be identified, such as "Could you also arrange for pizza, Joe?". Likewise, a segment 235 may be identified, such as "I will join you all after your meeting. Contact me when you are done, John." In some implementations the message segmentation system 130 may further subdivide the segment 235 into two segments, a sixth segment such as "I will join you all after your meeting." and a seventh segment such as "Contact me when you are done, John."

FIG. 3 is a table illustrating example segments and associated segment addressees. One or more aspects of the example table in FIG. 3 may be described with reference to the example electronic message 200 illustrated in FIG. 2. The columns of the example table of FIG. 3 are labeled $C_1$ to $C_8$. The first column $C_1$ lists the seven segment numbers identified in the example electronic message 200 illustrated in FIG. 2. The rows may be referenced based on the segment numbers. For example, the first row will correspond to the row associated with segment number 1, and so forth. The second column $C_2$ lists a segment content associated with each segment number. For example, the first segment 215 is associated with the segment content "You all can meet in the conference room at 3." In some implementations the coreference resolver 150 may identify a noun phrase "You". For illustrative purposes, the identified noun phrase is underlined. In some implementations a part-of-speech tagger may annotate the segment with the identified noun phrase. Likewise, the second segment is associated with the segment content "John, Joe, could you bring your laptops please?" Additional segment contents are illustrated in the second column, and selected noun phrases are underlined.

The third column $C_3$ lists the at least one noun phrase identified in the segment. For example, a noun phrase "You" may be identified in the first segment; noun phrases "John", "Joe", "you", "your" may be identified in the second segment; noun phrases "I" and "your" may be identified in the third segment; noun phrases "you", "your", "Joe" may be identified in the fourth segment; noun phrases "you", "Joe" may be identified in the fifth segment; noun phrases "I", "you", "your" may be identified in the sixth segment; and noun phrases "me", "you", "John" may be identified in the seventh segment.

The fourth column $C_4$ illustrates disambiguated noun phrases associated with the noun phrases identified and listed in the third column. For example, as described with reference to FIG. 2, the one or more message addressees of the electronic message may be identified as John, Maggie, and Joe. In some implementations the one or more message addressees of the electronic message may be utilized as antecedent noun phrases to disambiguate the at least one noun phrase appearing in the electronic message, based at least in part on electronic metadata, including fields such as "From:", "To:", "Cc:", "Bcc:", etc. For example, the "From:" field illustrated as sender 205 in FIG. 2 indicates that the message is generated by "Lisa". Based at least in part on such identification, the coreference resolver 150 may disambiguate each pronominal noun phrase "I" in the electronic message to refer to "Lisa". Likewise the "To:" field illustrated as recipients 210 in FIG. 2 indicates that the message is sent to John, Maggie, and Joe. Based at least in part on such identification, the coreference resolver 150 may disambiguate a pronominal noun phrase "you" in the electronic message to refer to "John", "Maggie", and/or "Joe".

The fifth column $C_5$ lists the one or more message addressees associated with the message. The one or more message addressees may be identified as the recipients of the message from the electronic metadata, including fields such as "To:", "Cc:", "Bcc:", etc. In this example, the one or more message addressees are "John", "Maggie", and "Joe".

In some implementations "Maggie" may be identified, for example via one or more databases, as a hypocorism for "Margaret", and "Joe" may be identified as a hypocorism for "Joseph". Accordingly, the collection of global addressees may be updated to {John, Margaret, and Joseph}, as is illustrated in column $C_6$ in the first row. Additionally, the addressee determination system 140 may determine that the first segment 215 does not include a vocative, and therefore the collection of vocative addressees may be determined to be an empty collection, as is illustrated in column $C_7$ in the first row. Based on such determinations, the one or more segment addressees associated with the first segment 215 may be determined to be the addresses, "John, Margaret, and Joseph", in the collection of global addressees, {John, Margaret, and Joseph}, as is illustrated in column $C_8$ in the first row.

The addressee determination system 140 may identify {John, Joe} as the collection of global addressees in the second segment based on identifying the noun phrases "John" and "Joe" and matching them to the one or more message addressees. In some implementations the collection of global addressees of the electronic message may be utilized as antecedent noun phrases to disambiguate the at least one noun phrase appearing in the segment. For example, the coreference resolver 150 may disambiguate the pronominal noun phrase "you" in the second segment to refer to "John and Joe" based on the collection of global addressees. In some implementations "Joe" may be identified as a hypocorism for "Joseph". Accordingly, the collection of global addressees may be updated to {John, Joseph}, as is illustrated in column $C_6$ in the second row. Additionally, the addressee determination system 140 may determine that the second segment does not include a vocative, and therefore the collection of vocative addressees may be determined to be an empty collection, as is illustrated in column $C_7$ in the second row. Based on such determinations, the one or more segment addressees associated with the second segment may be determined to be the addressees "John and Joseph" in the collection of global addressees, {John, Joseph}, as is illustrated in column $C_8$ in the second row.

As another example, the addressee determination system 140 may identify "Joe" as a vocative in the fourth segment. The addressee determination system 140 may further identify "Joseph" as the vocative addressee associated with the vocative. Also, for example, the vocative noun phrase "Joe" may be utilized as an antecedent noun phrase to disambiguate the noun phrase "you" to refer to "Joe". Additionally, the coreference resolver 150 may utilize a coreference resolution to resolve the noun phrase "your" in the fourth segment to refer to "Joe". Based on the determination that the fourth segment may be associated with a vocative, the addressee determination system 140 may determine that the collection of vocative addressees is {Joseph}. Accordingly, the one or more segment addressees associated with the fourth segment may be determined to be the addressee "Joseph" in the collection of vocative addressees, {Joseph}, as is illustrated in column $C_8$ in the fourth row.

In like manner, the addressee determination system 140 may identify "Joe" as a vocative in the fifth segment. The addressee determination system 140 may further identify "Joseph" as the vocative addressee associated with the vocative. Also, for example, the vocative noun phrase "Joe" may be utilized as an antecedent noun phrase to disambiguate the noun phrase "you" to refer to "Joe". Based on the determination that the fourth segment may be associated with a vocative, the addressee determination system 140 may determine that the collection of vocative addressees is {Joseph}. Accordingly, the addressee determination system 140 may determine that the one or more segment addressees associated with the fifth segment 230 may be determined to be the addressee "Joseph" in the collection of vocative addressees, {Joseph}, as is illustrated in column $C_8$ in the fifth row. Similarly, based on a determination that the seventh segment may be associated with a non-empty collection of vocative addressees {John}, the addressee determination system 140 may determine that the one or more segment addressees associated with the seventh segment may be determined to be the addressee "John", based on the collection of vocative addressees {John}, as is illustrated in column $C_8$ in the seventh row.

As described herein, the collection of global addressees may be associated with each segment, and the collection of global addressees may be initialized to a default set that may include the one or more message addressees of the electronic message. For example, the collection of global addressees of the first segment may be initially set to a value {John, Maggie, and Joe}. However, based on the segment content in the second column, and the disambiguated noun phrases in the fourth column, the collection of global addressees associated with the first segment may be updated to the value {John, Margaret, and Joseph}. In situations where the addressee determination system 140 identifies a non-empty collection of vocative addressees, the one or more segment addressees may be determined to be the addressees in the non-empty collection of vocative addressees, as illustrated in column $C_8$ in the fourth, fifth, and seventh rows. In situations where the addressee determination system 140 identifies that the collection of vocative addressees associated with the segment is empty, the one or more segment addressees may be determined to be the addressees in the collection of global addressees, as illustrated in column $C_8$ in the first, second, third, and sixth rows.

In some implementations the message segmentation system 130 may identify the one or more aspects of the task associated with the segment based on one or more language processing techniques. For example, the electronic message may include a segment such as "Joe, could you pick Molly up today?". Based on the techniques described herein, "Joe" may be determined to be a segment addressee, "you" may be co-referenced to "Joe", a task "Pick up Molly today" may be identified, and the task "Pick up Molly today" may be associated with "Joe". Also, for example, the one or more aspects of the task may be "pick up", "Molly", and "today".

In some implementations the message segmentation system 130 may identify the one or more aspects of the task associated with the segment based on associations stored in the content database 120. For example, the content database 120 may store mappings between reformulated versions of task requests and their associated one or more task requests. Such mappings may be based, for example, on an analysis of a plurality of electronic messages. For example, task requests such as "airline reservations?", "make air reservations", "reserve air tickets", may be mapped to a reformulated version such as "Make airline reservations".

For example, the electronic message may include a segment such as "airline reservations, Joe?". Based on the techniques described herein, a task request "airline reservations" may be identified, and the vocative "Joe" may be determined to be a segment addressee. The message segmentation system 130 may access the content database 120 to retrieve a reformulated version of the identified task request, such as "Make airline reservations", and the reformulated version may be associated with "Joe". Additionally, and/or alternatively, the content database 120 may be accessed to identify one or more entities with which Joe may interact to perform the task to "Make airline reservations".

In some implementations an indication may be provided that the segment pertains to one or more aspects of the segment. For example, the segment, the one or more segment addressees, and one or more aspects of a task associated with the segment may be determined, and the message segmentation system 130 may provide an indication to the determined one or more segment addressees that the segment pertains to the one or more aspects of the task associated with the segment. Such indication may be provided, for example, by highlighting a portion of the message that includes the one or more aspects of the task associated with the segment. Highlighting may include one or more of utilizing a larger font, utilizing bold, underlined, and/or italicized text, utilizing a color scheme to highlight the portion, and so forth. In some implementations a first segment addressed to first one or more segment addressees may be highlighted and provided to the first one or more segment addressees, and a second segment addressed to second one or more segment addressees may be highlighted and provided to the second one or more segment addressees. An indication may also be provided, for example, by adding a calendar entry pertaining to a task in a calendar associated with the one or more segment addressees, providing a reminder notification pertaining to a task addressed to the one or more segment addressees, providing, to the one or more segment addressees, one or more steps to complete the task, and so forth.

For example, an electronic message may be transmitted from John to Joe and Lisa, and may include a segment such as "Joe, could you make the airline reservations? Lisa, could you send me the draft of the memo". The message segmentation system 130 may segment the message into a first segment "Joe, could you make the airline reservations?" and a second segment "Lisa, could you send me the draft of the memo". The addressee determination system 140 may associate the first segment with the segment addressee "Joe" and associate the second segment with the segment addressee "Lisa". In some implementations the electronic message may be annotated before it is transmitted from John to Joe and Lisa. For example, a version of the electronic message transmitted to Joe may highlight the first segment, such as, for example, "Joe, could you make the airline reservations? Lisa, could you send me the draft of the memo". Also, for example, the version of the electronic message transmitted to Lisa may highlight the second segment, such as, for example, "Joe, could you make the airline reservations? Lisa, could you send me the draft of the memo".

As described herein, in some implementations identified tasks associated with each segment may be reformulated and provided to the one or more segment addressees associated with each segment. For example, Joe may be provided with the electronic message annotated with the task "Make the airline reservations", and/or Lisa may be provided with the electronic message annotated with the task "Send John the draft of the memo".

Additional and/or alternative techniques may be utilized to provide an indication that the segment pertains to the identified the task. For example, the electronic message may include a segment such as "Joe, could you make the airline reservations with Airline Company A?", and Joe may be provided with a link to Airline Company A, and/or provided with a telephone number associated with Airline Company A. As another example, the electronic message transmitted to Joe may include a segment such as "could you pick up the medicines on your way home", and based on a determination of "Joe" as the segment addressee, Joe may be provided with a telephone number of, and/or directions to, a pharmacy associated with Joe. Also, for example, Joe's calendar may be populated with a reformulated task "Pick up medicines on the way home".

FIG. 4 is a table illustrating example segment addressees, segments, and associated tasks. One or more aspects of the example table in FIG. 4 may be described with reference to the example table illustrated in FIG. 3, and/or the example electronic message 200 illustrated in FIG. 2. The first column lists segment addressees "John", "Margaret", and "Joseph". The segment addressees may be identified, for example from the eighth column $C_8$ of FIG. 3. The second column of the example table in FIG. 4 lists the segment numbers associated with the one or more segment addressees. For example, based on column $C_8$ of FIG. 3, the addressee determination system 140 may determine that "John" appears as a segment addressee associated with the first, second, sixth, and seventh segments of the electronic message. The second column in the example table in FIG. 4 associates "John" with the first, second, sixth, and seventh segments of the electronic message.

In some implementations a task may be identified based on the first segment, and additionally and/or alternatively, such a task may be reformulated. For example, the message segmentation system 130 may identify that the first segment "You all can meet in the conference room at 3." identifies a task "meet in the conference room at 3". Based at least in part on the one or more segment addressees, "John, Margaret, and Joseph", associated with the first segment, the addressee determination system 140 may identify that the attendees of this meeting are "John, Margaret, and Joseph". Additionally, since the task is being associated with John, the addressee determination system 140 may reformulate the task as "Meet Margaret, and Joseph in the conference room at 3", as illustrated in the third column of the example table in FIG. 4.

The client devices 110, the content database 120, the message segmentation system 130, the addressee determination system 140, and the coreference resolver 150 may each include memory for storage of data and software applications, a processor for accessing data and executing applications, and components that facilitate communication over the communication network 101. The client devices 110 may execute applications, such as web browsers (e.g., web browser executing on client device 110), that allow users to receive and place a telephone call, receive and send a text message, receive and send emails, interact with social networking sites, issue search queries, and so forth. The content database 120, the message segmentation system 130, the addressee determination system 140, and the coreference resolver 150 may be implemented in hardware, firmware, and/or software running on hardware. For example, one or more of the systems may be implemented in one or more computer servers.

Figure 5:
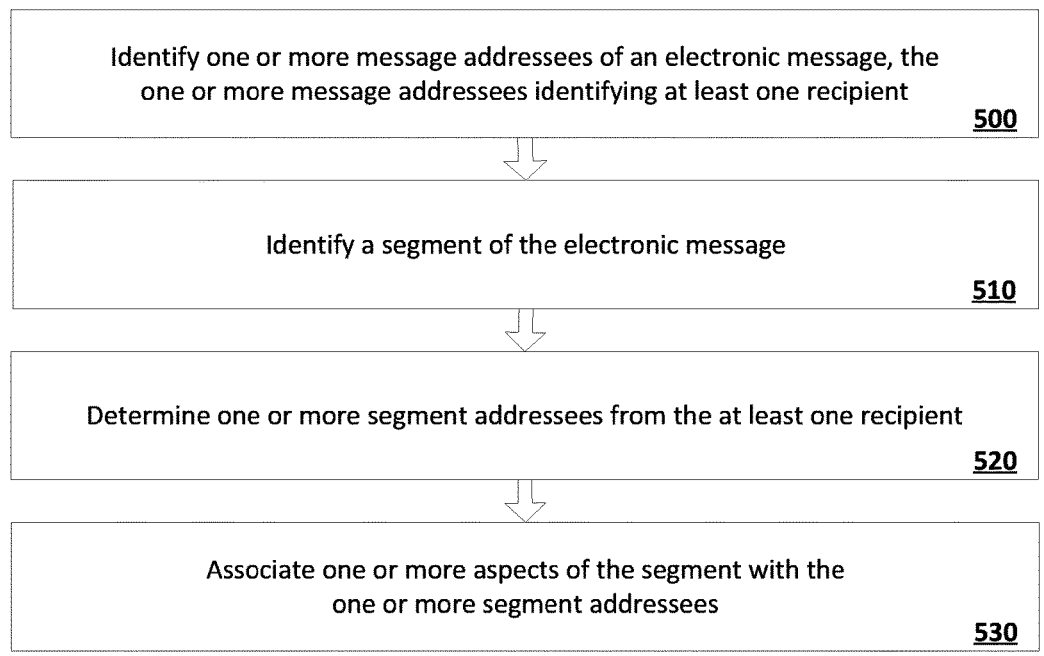
FIG. 5 is a flow chart illustrating an example method of associating a segment of an electronic message with one or more segment addressees.

Referring to FIG. 5, a flow chart illustrates an example method of associating a segment of an electronic message with one or more segment addressees. Other implementations may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, the message segmentation system 130, the addressee determination system 140, and the coreference resolver 150 of FIG. 1.

At step 500, one or more message addressees of an electronic message may be identified. The one or more message addressees may identify at least one recipient of the electronic message. In some implementations the message segmentation system 130 may identify the one or more message addressees of the electronic message. In some implementations metadata associated with the electronic message may provide indication of one or more message addressees for the electronic message.

For example, Lisa may send a first message to John and Maggie, and Maggie may include the first message in a second message to Joe and Scott. In such instances, John and Maggie may be identified as addressees of the first message, and Joe and Scott may be identified as addressees of the second message.

At step 510, a segment of the electronic message may be identified. In some implementations the message segmentation system 130 may identify the segment of the electronic message. In some implementations, the segment of the electronic message may be identified based on one or more determined language units such as words, lines, sentences, paragraphs, and/or topics. For example, the message segmentation system 130 may identify each character associated with a "period", and may identify a sentence as a text segment between two consecutive characters associated with a "period". In some implementations a segment of an electronic message may be identified based on line breaks, paragraph breaks, section breaks, topic headings, page breaks, and so forth. For example, the message may be in html format, and the message segmentation system 130 may identify a paragraph based on identifying an html tag for a paragraph break. In some implementations topic change markers may be identified and utilized to determine the segments. For example, the message segmentation system 130 may identify terms such as "step", "moving on", "next part", "other step", "previous step", "in conclusion", etc. as topic change markers, and utilize such markers to determine the segments.

As described herein, in some implementations a segment of the electronic message may be a paragraph of the electronic message. For example, an electronic message in html format may include tag references for a single line break (e.g., <br>), and/or for a paragraph break (e.g., </p>), and one or more of the tag references may be utilized to identify a paragraph. In some implementations an identified segment may include two or more paragraphs. One or more natural language processing techniques may be optionally utilized to identify a paragraph and/or other text segment of the electronic message. For example, key terms and/or key phrases may be identified along with their parts of speech. A parse tree may be determined that links key terms and/or phrases in one or more sentences based on their syntactic and/or semantic relationships. In some implementations a context-free grammar may be utilized to structure a sentence from the parse tree. Transitional terms such as "first", "next", "followed by", "after", "at the outset", "finally", etc. may be optionally utilized to identify a segment that is a paragraph and/or a sentence. Additional and/or alternative techniques may be utilized to segment an electronic message. For example, statistical decision making techniques, as well as syntactic and semantic attributes of the message may be utilized to identify segments.

In some implementations a task associated with the segment may be identified. Generally, the task may relate to one or more activities that the one or more message addressees has an interest in completing and/or having completed by the at least one recipient of the electronic message. In some implementations the message segmentation system 130 may identify the task based on one or more conventional techniques, for example, classifier techniques, and/or language processing techniques. For example, the electronic message may include a segment such as "Joe, could you pick Molly up today?". Based on conventional or other techniques, "Pick Molly up today" may be identified as a task associated with the segment addressee. In some implementations the task may be a request and/or an instruction to perform an action.

At step 520, one or more segment addressees from the at least one recipient may be determined. The one or more segment addressees identify an addressee for the segment. In some implementations the addressee determination system 140 may determine the one or more segment addressees of the one or more segments of the electronic message. In some implementations the one or more segment addressees of a segment may include each recipient of the electronic message. For example, John may send a message to Lisa and Joe, and the message may include the sentence "See you soon." In some implementations Lisa and Joe may be identified as the one or more message addressees of the electronic message, and the sentence "See you soon" may be identified as a segment. The coreference resolver 150 may resolve the term "you" to refer to Lisa and Joe, based at least in part on the determination that Lisa and Joe are the recipients of the electronic message. Accordingly, the one or more segment addressees may be determined to be Lisa and Joe. Also, for example, Lisa may send a first message to John and Joe, and John may respond to the first message with "ok". The message segmentation system 130 may identify "ok" as a segment, optionally as a segment that does not include a noun phrase, and the addressee determination system 140 may determine the one or more segment addressees associated with the only segment in John's message to be Lisa and Joe, based on the identified recipients of John's message.

In some implementations determining the one or more segment addressees may include identifying, from the at least one recipient, a collection of global addressees. The collection of global addressees identifies the at least one recipient to whom the segment of the electronic message is addressed. For example, the segment of the message may be addressed to all the recipients. In such an instance, the collection of global addressees is the collection of all the recipients of the electronic message. In some implementations, the collection of global addressees may be updated based on the segment of the electronic message, as for example, when the segment of the electronic message may be addressed to a subset of the recipients of the electronic message. For example, John may send a message to Lisa and Joe, and the message may include the sentence "See you soon. Joe can you pick me up in 5 mins?". As previously described, Lisa and Joe may be identified as the one or more message addressees. In some implementations, the collection of global addressees may be initialized to the collection {Lisa, Joe}. Although the sentence "See you soon" is directed to both the recipients Lisa and Joe, the request "Joe can you pick me up in 5 mins?" is directed specifically to Joe and not to Lisa. Accordingly, the collection of global addressees may be updated from the collection {Lisa, Joe} to the collection {Joe}.

As another example, the collection of global addressees may be initialized to {John, Maggie, Joe}, a collection that includes all the recipients of the electronic message. A segment such as "John, Joe can you pick me up at 5?" may be identified, and "Joe" may be identified as the addressee of the segment. Accordingly, the collection of global addressees may be updated from {John, Maggie, Joe} to {John, Joe}. In the absence of a vocative, the one or more segment addressees may be the addressees in the collection of global addressees. Accordingly, the one or more segment addressees may be determined to be John and Joe, based on the collection of global addressees {John, Joe}.

In some implementations determining the one or more segment addressees may include identifying, based on a presence or absence of a vocative in the segment, a collection of vocative addressees. The collection of vocative addressees identifies the at least one recipient to whom the segment of the electronic message is addressed to via a vocative. A vocative is a phrase that may be utilized to attract the attention of a person identified by the phrase. In some implementations the vocative may appear at the end of the segment, and may be separated by a comma (e.g., "Please bring me some coffee, kiddo."). In some implementations the vocative may appear within the flow of the segment, and may be separated by a pair of commas (e.g., "Please bring me some coffee, kiddo, and the newspaper."). In the absence of a vocative, the collection of vocative addressees may be an empty collection.

In some implementations the addressee determination system 140 may update the collection of vocative addressees based on a determination that a vocative is present in the segment. A vocative addressee may be the disambiguated identifier for a vocative. In situations where the vocative identifies a person unambiguously, the identified person is the vocative addressee. For example, the collection of vocative addressees may be initialized to be the empty collection. A segment such as "Are you available, John?" may be identified. A vocative "John" may be identified, and the collection of vocative addressees may be updated from the empty collection to {John}. In the presence of a vocative, the one or more segment addressees may be determined to be the addressees in the collection of vocative addressees. Accordingly, the one or more segment addressees may be determined to be John, based on the collection of vocative addressees {John}.

At step 530, one or more aspects of the segment may be associated with the one or more segment addressees. In some implementations the addressee determination system 140 may associate the one or more aspects of the segment with the one or more segment addressees. For example, based at least in part on the techniques described herein, the segment "John, Joe can you pick me up at 5?" may be associated with the one or more segment addressees John and Joe. In some implementations the one or more aspects of the segment may be one or more aspects of a task associated with the segment. For example, based at least in part on the techniques described herein, a task "Pick me up at 5" may be associated with the segment "John, Joe can you pick me up at 5?", and the segment may be associated with the one or more segment addressees John and Joe. Accordingly, the task "Pick me up at 5" may be associated with John and Joe.

As described herein, in some implementations the message segmentation system 130 may identify the one or more aspects of the task associated with the segment based on one or more language processing techniques. For example, the electronic message may include a segment such as "Joe, could you pick Molly up today?". Based on the techniques described herein, "Joe" may be determined to be a segment addressee, "you" may be co-referenced to "Joe", a task "Pick up Molly today" may be identified as an aspect of the segment, and the task "Pick up Molly today" may be associated with "Joe".

In some implementations the message segmentation system 130 may identify the one or more aspects of the task associated with the segment based on associations stored in the content database 120. For example, the content database 120 may store mappings between reformulated versions of task requests and their associated one or more task requests. Such mappings may be based, for example, on an analysis of a plurality of electronic messages. For example, task requests such as "airline reservations?", "make air reservations", "reserve air tickets", may be mapped to a reformulated version such as "Make airline reservations".

In some implementations an indication pertaining to the one or more aspects of the task associated with the segment may be provided to the one or more segment addressees. For example, the segment, the one or more segment addressees, and the one or more aspects of the task associated with the segment may be determined, and the message segmentation system 130 may provide an indication to the determined one or more segment addressees that the segment pertains to the one or more aspects of the task associated with the segment. Such indication may be provided, for example, by highlighting a portion of the message that includes the one or more aspects of the task associated with the segment. In some implementations a first segment addressed to first one or more segment addressees may be highlighted and provided to the first one or more segment addressees, without being provided to other addressees; and a second segment addressed to second one or more segment addressees may be highlighted and provided to the second one or more segment addressees, without being provided to other addressees. An indication may also be provided, for example, by adding a calendar entry pertaining to a task in a calendar associated with the one or more segment addressees, providing a reminder notification pertaining to a task addressed to the one or more segment addressees, providing, to the one or more segment addressees, one or more steps to complete the task, and so forth.

Figure 6:
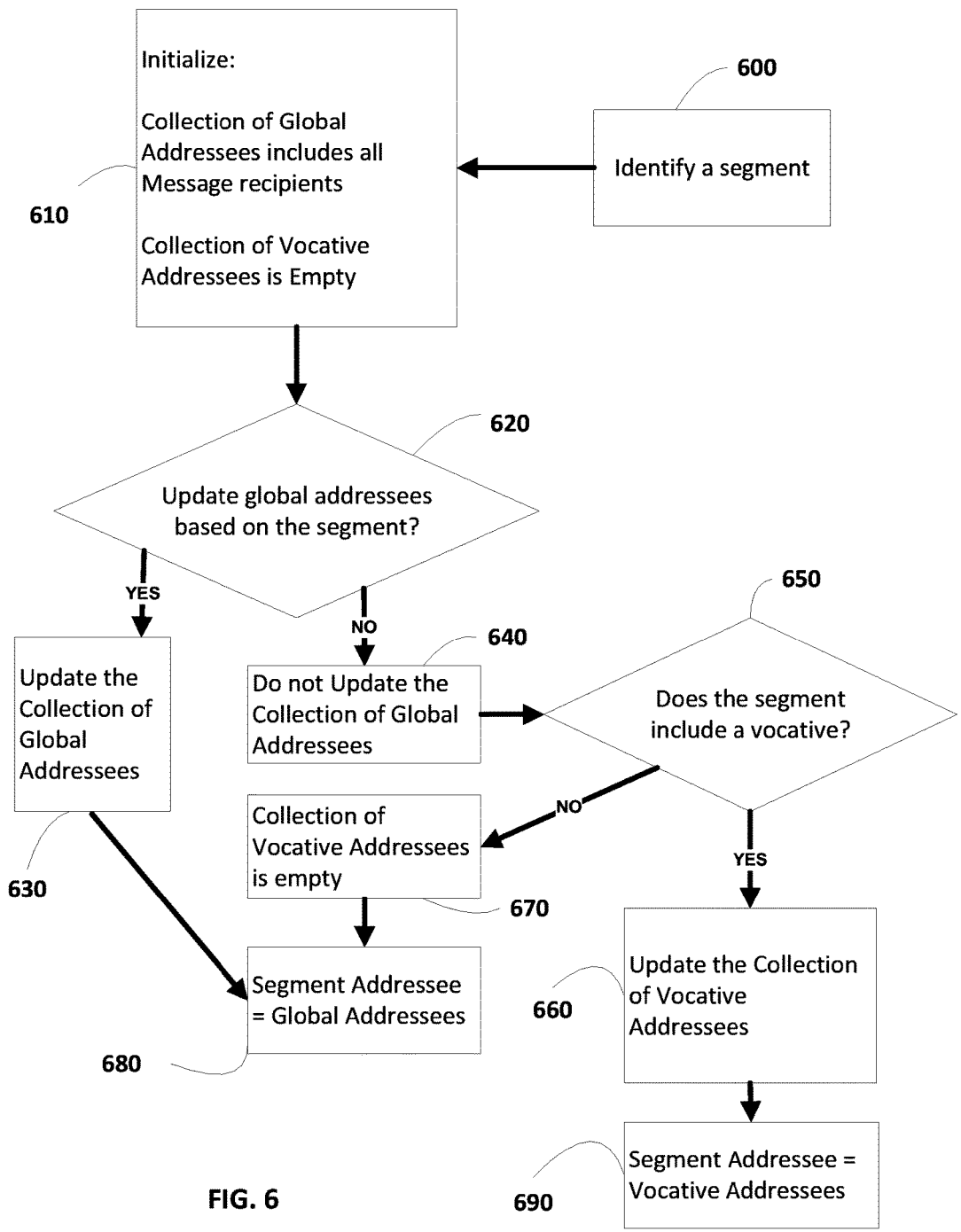
FIG. 6 is a flow chart illustrating an example method of determining one or more segment addressees.

Referring to FIG. 6, a flow chart illustrates an example method of determining one or more segment addressees. Other implementations may perform the steps in a different order, omit certain steps, and/or perform different and/or additional steps than those illustrated in FIG. 6. For convenience, aspects of FIG. 6 will be described with reference to a system of one or more computers that perform the process. The system may include, for example, the message segmentation system 130, the addressee determination system 140, and the coreference resolver 150 of FIG. 1.

At step 600, the message segmentation system 130 identifies a segment of the electronic message. At step 610, the addressee determination system 140 may initialize the collection of global addressees to include all the recipients of the electronic message. For example, the collection of global addressees may be initialized as {John, Joe, Maggie}. The addressee determination system 140 may initialize the collection of vocative addressees to be the empty collection.

At step 620, the addressee determination system 140 may determine if the collection of global addressees needs to be updated based on the segment. For example, the segment may include an initial exhortation. For example, the segment may be a sentence such as "John, Maggie, could you please bring your laptops?". In such an instance, "John" and "Maggie" are initial exhortations identifying John and Maggie as persons to whom the segment is addressed. In some implementations the addressee determination system 140 may determine that the collection {John, Maggie} is not the same as the collection of global addressees {John, Joe, Maggie} initialized at step 610. Accordingly, at step 620, the addressee determination system 140 may determine that the collection of global addressees needs to be updated based on the segment. At step 630, the collection of global addressees may be updated from {John, Joe, Maggie} to {John, Maggie}.

Based on a determination that the collection of global addressees does not need to be updated, the process may flow to step 640. At step 640, based on a determination that the collection of global addressees does not need to be updated, the collection of global addressees is not updated, and is determined to be {John, Joe, Maggie}, as initialized at step 610.

The process may then flow to step 650, where the addressee determination system 140 may determine if the segment includes a vocative. A vocative is a phrase that may be utilized to attract the attention of a person identified by the phrase. In some implementations the vocative may appear at the end of the segment, and may be separated by a comma (e.g., "Please bring me some coffee, kiddo."). In some implementations the vocative may appear within the flow of the segment, and may be separated by a pair of commas (e.g., "Please bring me some coffee, kiddo, and the newspaper.").

Based on a presence of a vocative in the segment, the process moves to step 660. Based on an absence of a vocative in the segment, the process moves to step 670.

At step 660, the addressee determination system 140 updates the collection of vocative addressees based on a determination that a vocative is present in the segment. A vocative addressee may be the disambiguated identifier for a vocative. In situations where the vocative identifies a person unambiguously, the identified person is the vocative addressee. For example, in "Please bring me some coffee, Joe", the vocative identifies "Joe" as the person being addressed in the segment. Accordingly, the collection of vocative addressees is updated from the empty collection to the collection {Joe}, and "Joe" may be identified as the vocative addressee.

In some implementations the vocative may not identify a person unambiguously. For example, the vocative noun phrase may be a nominal, and/or pronominal noun phrase. In such instances, the collection of vocative addressees may be identified by disambiguating the vocative noun phrase. For example, John may send a message to Lisa and Joe, and the message may include the sentence "See you soon, kiddo." One or more techniques may be utilized to disambiguate the term "kiddo" to mean "Joe". For example, one or more prior messages sent by John may indicate that "kiddo" refers to Joe. For example, John may have sent a prior message to Joe with the message "Take care of yourself, kiddo," indicating that John may refer to Joe as "kiddo". In some implementations such information may be identified based on one or more electronic messages associated with John, and the information may be stored in one or more databases such as content database 120. In some implementations the one or more databases may be personal databases that may include access restricted to John and/or one or more users authorized by John. Accordingly, the vocative noun phrase "kiddo" may be disambiguated to "Joe", and the collection of vocative addressees may be updated from the empty collection to {Joe}.

At step 670, based on a determination of an absence of a vocative in the segment, the collection of vocative addressees may not be updated, and may be determined to be the empty collection, as initialized at step 610.

At step 680, based on a determination that the collection of vocative addressees is empty, the addressee determination system 140 determines the one or more segment addressees to be addressees in the collection of global addressees. As described herein, the collection of global addressees may be associated with each segment, and the collection of global addressees may be initialized to a default set that includes all the recipients of the electronic message. For example, again with reference to FIG. 3, the collection of global addressees of the first segment in the first row may be initially set to a value {John, Maggie, Joe}. However, based on the segment content in the second column, and the disambiguated noun phrases in the fourth column, the collection of global addressees associated with the first segment may be updated to the value {John, Margaret, Joseph}. In situations where the addressee determination system 140 identifies that the collection of vocative addressees associated with the segment is empty, the one or more segment addressees is determined to be the global addressees in the collection of global addressees, as illustrated in column $C_8$ in the first, second, third, and sixth rows, corresponding to the first, second, third, and sixth segments of FIG. 3.

At step 690, based on a determination that the collection of vocative addressees is non-empty, the addressee determination system 140 determines the one or more segment addressees to be the vocative addressees in the collection of vocative addressees. For example, again with reference to FIG. 3, non-empty collections of vocative addressees are associated with the fourth, fifth, and seventh segments of the example illustrated in FIG. 3. Accordingly, the one or more segment addressees are determined to be the vocative addressees in the collection of vocative addressees, as illustrated in column $C_8$ in the fourth, fifth, and seventh rows corresponding to the fourth, fifth, and seventh segments of FIG. 3.

Figure 7:
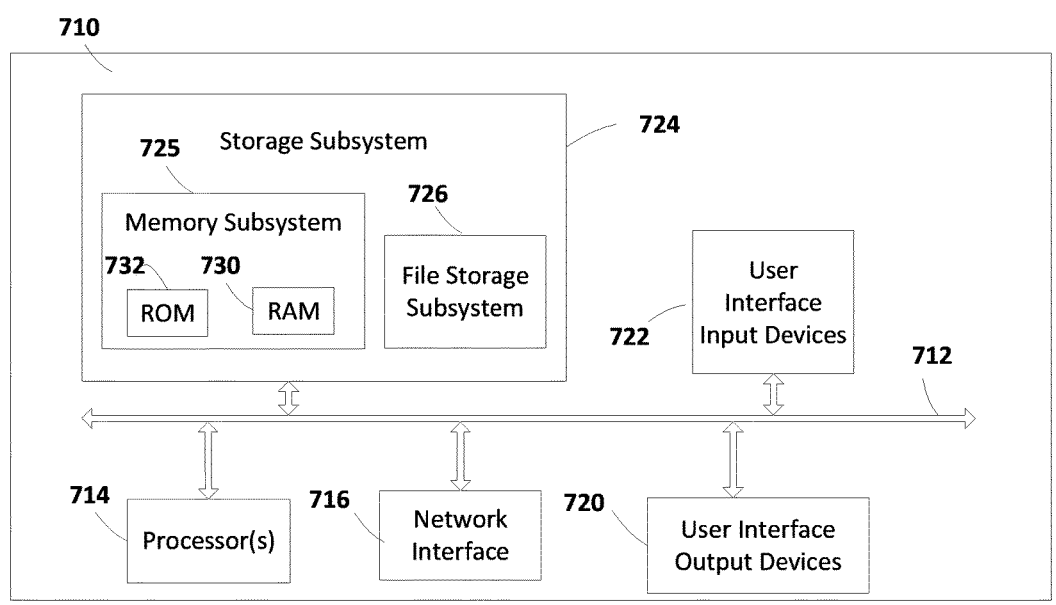
FIG. 7 illustrates a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to determine a coreference resolution of a noun phrase. As another example, the storage subsystem 724 may include the logic to associate one or more aspects of a segment with one or more segment addressees.

These software modules are generally executed by processor 714 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   identifying, by one or more processors, a plurality of recipients of a transmitted electronic message;
   identifying, by one or more of the processors,
      a task included in a textual segment of the electronic message, and
      an additional task included in an additional textual segment of the electronic message;
   determining, by one or more of the processors, that a group of one or more of the recipients is associated with the task, wherein the group is a subset of the recipients, and wherein determining that the group is associated with the task comprises:
      identifying a textual given noun phrase associated with the segment that includes the task,
      determining a coreference resolution for the given noun phrase, and
      determining that the group is associated with the task based on the coreference resolution of the given noun phrase;
   determining, by one or more of the processors, that an additional group of one or more of the recipients is associated with the additional task, wherein the additional group is another subset of the recipients that varies from the group, and wherein determining that the additional group is associated with the additional task comprises:
      identifying a textual additional noun phrase associated with the additional segment that includes the additional task,
      determining an additional coreference resolution for the additional noun phrase, and
      determining that the additional group is associated with the additional task based on the additional coreference resolution of the additional noun phrase;
   by one or more of the processors in response to determining that the group is associated with the task:
      providing, for presentation to the one or more recipients of the group determined to be associated with the task, the electronic message with:
         the given noun phrase and the segment, and
         an indication pertaining to the one or more aspects of the task included in the segment; and
   by one or more of the processors in response to determining that the additional group is associated with the additional task:
      providing, for presentation to the one or more recipients of the additional group determined to be associated with the additional task, the electronic message with:
         the additional given noun phrase and the additional segment, and
         an additional indication pertaining to the additional task included in the additional segment;
   wherein the electronic message is provided for presentation, to each of the recipients that are not in the determined group, without providing the indication, and
   wherein the electronic message is provided for presentation, to each of the recipients that are not in the determined additional group, without providing the additional indication.

2. The method of claim 1, wherein providing the indication comprises highlighting the segment of the electronic message for the one or more recipients of the group determined to be associated with the task.

3. The method of claim 1, wherein providing the indication comprises providing a reminder notification pertaining to the task to the one or more recipients of the group determined to be associated with the task.

4. The method of claim 1, wherein providing the indication comprises providing steps to complete the task to the one or more recipients of the group determined to be associated with the task.

5. The method of claim 1, wherein determining the coreference resolution for the given noun phrase includes learning a coreference embedding for the given noun phrase.

6. The method of claim 5, wherein learning the coreference embedding is based on generating at least one feature representation of the given noun phrase.

7. The method of claim 6, wherein the at least one feature representation of the given noun phrase includes a feature representation of the given noun phrase as a vocative noun phrase.

8. The method of claim 1, wherein identifying the segment of the electronic message is based on identification of one or more of a paragraph break and a line break.

9. A system, comprising:
memory storing instructions;
one or more processors executing the instructions stored in the memory to:
provide an electronic message to each of a plurality of recipients, the electronic message including a textual given noun phrase and a textual segment for presentation to each of the recipients;
identify: a task included in the segment of the electronic message, and an additional task included in an additional textual segment of the electronic message;
determine that a group of one or more of the recipients is associated with the task, wherein the group is a subset of the recipients, and wherein in determining that the group is associated with the task one or more of the processors are to:
  identify that the given noun phrase is associated with the segment that includes the task,
  determine a coreference resolution for the given noun phrase, and
  determine that the group is associated with the task based on the coreference resolution of the given noun phrase;
determine that an additional group of one or more of the recipients is associated with the additional task, wherein the additional group is another subset of the recipients that varies from the group, and wherein in determining that the additional group is associated with the additional task one or more of the processors are to:
  identify a textual additional noun phrase associated with the additional segment that includes the additional task,
  determine an additional coreference resolution for the additional noun phrase, and
  determine that the additional group is associated with the additional task based on the additional coreference resolution of the additional noun phrase;
in response to determining that the group is associated with the task:
  provide, for presentation to only the one or more recipients of the group determined to be associated with the task, an indication pertaining to the one or more aspects of the task included in the segment, wherein in providing the indication the one or more processors are to provide the segment with highlighting that visually distinguishes the segment; and
in response to determining that the additional group is associated with the additional task:
  provide, for presentation to only the one or more recipients of the additional group determined to be associated with the additional task, an additional indication pertaining to the one or more aspects of the additional task included in the additional segment, wherein in providing the additional indication the one or more processors are to provide the additional segment with highlighting that visually distinguishes the additional segment.

10. The system of claim 9, wherein in providing the indication the one or more processors are to further provide a reminder notification pertaining to the task to the one or more recipients of the group determined to be associated with the task.

11. The system of claim 9, wherein in providing the indication the one or more processors are to further provide steps to complete the task to the one or more recipients of the group determined to be associated with the task.

12. The system of claim 9, wherein in determining the coreference resolution for the given noun phrase one or more of the processors are to learn a coreference embedding for the given noun phrase.

13. The system of claim 12, wherein in learning the coreference embedding one or more of the processors are to learn the coreference embedding based on generating at least one feature representation of the given noun phrase.

14. The system of claim 13, wherein the at least one feature representation of the given noun phrase includes a feature representation of the given noun phrase as a vocative noun phrase.

15. A computer-implemented method, comprising:
identifying, by one or more processors, a plurality of recipients of a transmitted electronic message;
identifying, by one or more of the processors, a textual segment of the electronic message, and an additional task included in an additional textual segment of the electronic message;
determining, by one or more of the processors, that at least one recipient of the recipients is associated with the segment, wherein determining that the at least one recipient is associated with the segment comprises:
  identifying a textual given noun phrase associated with the segment,
  determining a coreference resolution for the given noun phrase, and
  determining that the at least one recipient is associated with the segment based on the coreference resolution of the given noun phrase;
determining, by one or more of the processors, that at least one additional recipient of one or more of the recipients is associated with the additional task, wherein determining that the additional recipient is associated with the additional task comprises:
  identifying a textual additional noun phrase associated with the additional segment that includes the additional task,
  determining an additional coreference resolution for the additional noun phrase, and
  determining that the additional recipient is associated with the additional task based on the additional coreference resolution of the additional noun phrase;
providing, by one or more of the processors for presentation to the at least one recipient determined to be associated with the segment, an indication that is based on the segment,
  wherein the indication is provided to the at least one recipient based on determining that the at least one recipient is associated with the segment,
  wherein the indication is provided to the at least one recipient without being provided to one or more other of the recipients not determined to be associated with the segment; and
providing, by one or more of the processors for presentation to the additional recipient determined to be associated with the additional segment, an additional indication that is based on the additional segment,
  wherein the additional indication is provided to the additional recipient based on determining that the additional recipient is associated with the additional segment, and
  wherein the additional indication is provided to the additional recipient without being provided to one or more other of the recipients not determined to be associated with the additional segment.

16. The method of claim 15, wherein providing the indication comprises highlighting the segment of the electronic message for the at least one recipient determined to be associated with the segment.

17. The method of claim 15, wherein providing the indication comprises providing a reminder notification, pertaining to a task associated with the segment, to the at least one recipient determined to be associated with the segment.

18. The method of claim 15, wherein providing the indication comprises providing steps to complete a task associated with the segment, to the at least one recipient determined to be associated with the segment.

* * * * *